United States Patent
Imai

(10) Patent No.: US 7,665,741 B2
(45) Date of Patent: Feb. 23, 2010

(54) LAMINATE-TYPE GASKET

(75) Inventor: Toshihiro Imai, Tokyo (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 0 days.

(21) Appl. No.: 12/068,911

(22) Filed: Feb. 13, 2008

(65) Prior Publication Data

US 2008/0197579 A1 Aug. 21, 2008

(30) Foreign Application Priority Data

Feb. 16, 2007 (JP) .............................. 2007-036436

(51) Int. Cl.
*F02F 11/00* (2006.01)
(52) U.S. Cl. ................. 277/592; 277/595; 277/600; 277/601
(58) Field of Classification Search ............ 277/592, 277/593, 595, 600, 601
See application file for complete search history.

(56) References Cited

U.S. PATENT DOCUMENTS

| | | | | |
|---|---|---|---|---|
| 1,472,133 | A * | 10/1923 | Oven ........................ | 277/598 |
| 4,468,044 | A * | 8/1984 | Ulmer et al. ................ | 277/596 |
| 4,807,892 | A * | 2/1989 | Udagawa .................... | 277/595 |
| 4,898,396 | A * | 2/1990 | Udagawa .................... | 277/592 |
| 5,169,163 | A * | 12/1992 | Udagawa et al. ............ | 277/593 |
| 5,277,433 | A * | 1/1994 | Ishikawa et al. ............ | 277/593 |
| 5,435,575 | A * | 7/1995 | Udagawa .................... | 277/592 |
| 5,511,796 | A * | 4/1996 | Udagawa .................... | 277/593 |
| 5,899,462 | A * | 5/1999 | Udagawa .................... | 277/593 |
| 6,105,971 | A * | 8/2000 | Hasegawa ................... | 277/593 |
| 6,139,024 | A * | 10/2000 | Yakushiji et al. ............ | 277/592 |
| 6,378,876 | B1 * | 4/2002 | Matsushita .................. | 277/593 |
| 6,431,554 | B1 * | 8/2002 | Miyamoto et al. .......... | 277/593 |
| 6,478,302 | B1 * | 11/2002 | Nakamura ................... | 277/317 |
| 6,758,479 | B2 * | 7/2004 | Miyaoh ....................... | 277/598 |
| 6,827,352 | B2 * | 12/2004 | Ueta et al. .................. | 277/593 |
| 7,290,770 | B2 * | 11/2007 | Kasuya ....................... | 277/592 |
| 7,377,520 | B2 * | 5/2008 | Imai ........................... | 277/594 |
| 2003/0085530 | A1 * | 5/2003 | Miyaoh et al. .............. | 277/593 |
| 2005/0179210 | A1 * | 8/2005 | Sueda ......................... | 277/592 |
| 2007/0090607 | A1 * | 4/2007 | Ueta et al. .................. | 277/593 |

* cited by examiner

*Primary Examiner*—Alison K Pickard
(74) *Attorney, Agent, or Firm*—Manabu Kanesaka

(57) ABSTRACT

A metal laminate gasket includes a first metal substrate having a base portion and a folded portion, a second metal substrate laminated with the first metal plate, an intermediate plate disposed between the base portion and the second metal substrate, and a bead plate situated under the base portion. The bead plate includes a first full bead disposed around the first hole to project toward the base portion, and an outside portion disposed above the intermediate plate. The bead plate, first and second metal substrates and intermediate plate have first and second holes. The bead plate is formed to surround the first and second holes without extending to an entire area of the gasket. The total plate thickness of the first and second metal substrates, bead plate and intermediate plate at the full bead position is substantially same as that around the second hole.

12 Claims, 4 Drawing Sheets

LAMINATE-TYPE GASKET

BACKGROUND OF THE INVENTION AND RELATED ART STATEMENT

The present invention relates to a laminate-type gasket such as a cylinder head gasket which is held between a cylinder head and a cylinder block of an engine and seals therebetween, or an exhaust manifold gasket which is held between an exhaust manifold and an exhaust pipe and seals therebetween.

In an automobile engine, the laminate-type gasket such as the cylinder head gasket or the exhaust manifold gasket is used. The cylinder head gasket is held between engine members such as the cylinder head and the cylinder block (cylinder body) and the like, tightened by head belts, and seals fluid such as combustion gas, oil, coolant water and the like. The exhaust manifold gasket is held between the exhaust manifold and the exhaust pipe, and seals the combustion gas.

On the other hand, the laminate-type gasket includes secondary sealing-target holes such as bolt holes and the like for attaching the laminate-type gasket to an engine member besides main sealing-target holes such as cylinder bores and the like. In a conventional technology, the engine member was made of cast iron, so that a fastening force could increase without deforming the sealing-target holes. Also, pressure of the combustion gas of the engine was relatively low, and required sealing performance was low, so that even sealing performance around the bolt holes did not have any special problem.

However, due to a lightweight and high power engine, recently, the engine member is made of aluminum alloy, so that rigidity has declined and an indentation due to tightening can easily occur. Accordingly, high sealing performance is required. However, it is difficult to increase the fastening force. Moreover, when an unequal force is applied to a contact surface of the gasket, the sealing-target holes such as the cylinder bores and the like on an engine member side may be deformed.

Among the above-mentioned laminate-type gaskets, as shown in FIGS. 7 and 8, there is a laminate-type gasket 1X wherein a first metal substrate 10 provides a folded portion 12 on a peripheral border portion of a main sealing-target hole 2, and wherein bead plates 30X with full beads 31 for the main sealing-target holes 2 are placed inside the folded portions 12. In the laminate-type gasket 1X including the bead plates 30X, the bead plates 30X are placed only around the main sealing-target holes 2, so that, as shown in FIG. 7, the bead plates 30X are formed only on the peripheral border portions of the main sealing-target holes 2 in a circular shape. Incidentally, a cylinder head gasket, which includes the circular bead plates and is provided with full beads surrounding beads of the bead plates in the first metal substrate, is proposed (for example, refer to Japanese Patent Unexamined Publication No. 2003-139247).

In the above-described laminate-type gasket 1X, by applying a large pressing force near a bolt hole 3 by fastening a fastening bolt, the sealing performance of the bolt hole 3 which is the secondary sealing-target hole could be assured sufficiently. However, in a recent aluminum alloy engine, due to declined rigidity of the engine member, a large bolt fastening force cannot be applied. As a result, the sealing performance around the bolt hole 3 is difficult to be obtained. Moreover, the number of the metal structural plates on a sealing-target hole 2 side is greater than that around the bolt hole 3, so that a seal surface pressure on the sealing-target hole 2 side becomes larger than that around the bolt hole 3. As a result, the sealing-target hole 2 may be easily deformed.

The present invention is made in order to solve the problems described above, and an object of the present invention is to provide a laminate-type gasket such as the cylinder head gasket or the manifold gasket and the like, which are used for the engine, can improve the sealing performance of each sealing target hole, and can reduce deformation of members which hold the laminate-type gasket, such as the deformation of the cylinder bores.

Further objects and advantages of the invention will be apparent from the following description of the invention.

SUMMARY OF THE INVENTION

In order to achieve the object described above, a laminate-type gasket according to the invention forms a folded portion on the peripheral border portion of a first sealing-target hole of a first metal substrate. A second metal substrate is placed by inserting an inner-periphery side flat portion thereof inside the folded portion. In the second metal substrate, a first half bead is formed on the outer periphery side of the inner-periphery side flat portion. An outer-periphery side flat portion outside the first half bead is placed on a folded portion side relative to a plate thickness direction. Moreover, inside the folded portion, a bead plate including a first full bead, which projects to a first metal substrate side for the first sealing-target hole, is laminated between the inner-periphery side flat portion of the second metal substrate and the first metal substrate. Also, an intermediate plate is laminated between the outer-periphery side flat portion of the second substrate and the outer-periphery side flat portion on the outer periphery side of the first full bead of the bead plate.

In the laminate-type gasket, a second sealing-target hole is provided in the first metal substrate; the outer-periphery side flat portion of the second metal substrate; the outer-periphery side flat portion of the bead plate; and the intermediate plate. The bead plate is formed in such a way as to surround the first sealing-target hole and the second sealing-target hole.

Also, in the laminate-type gasket, the total plate thickness of the metal structural plates in a first full bead position and the total plate thickness of the metal structural plates around the peripheral border portion of the second sealing-target hole have substantially the same. In addition, in the laminate-type gasket, a second full bead or a second half bead is provided around the second sealing-target hole on the bead plate.

According to the laminate-type gasket of the invention, as compared to the surrounding of the first sealing-target hole and that of the second sealing-target hole, plate thicknesses of the laminated metal substrates are approximately or exactly the same. As a result, the sealing performance of the second sealing-target hole can be improved. Also, even when a large pressing force is applied, an unequal level of seal surface pressures generated around the respective first sealing-target hole and second sealing-target hole, can be controlled. Accordingly, the deformation around the sealing-target holes on the side of the members holding the laminate-type gasket, can be prevented.

DETAILED DESCRIPTION OF PREFERRED EMBODIMENTS

Hereunder, embodiments of laminate-type gaskets according to the present invention will be described with reference to the attached drawings as examples of exhaust manifold gaskets. Incidentally, FIGS. 1 to 8 are schematic explanatory views in which sizes of sealing-target holes, bolt holes and beads, shapes and so on are different from actual ones and enlarged for the sake of explanation. Also, here, the exhaust manifold gasket is explained as an example, and the invention can also be applied to another laminate-type gasket such as a cylinder head gasket and the like.

Figure 1:
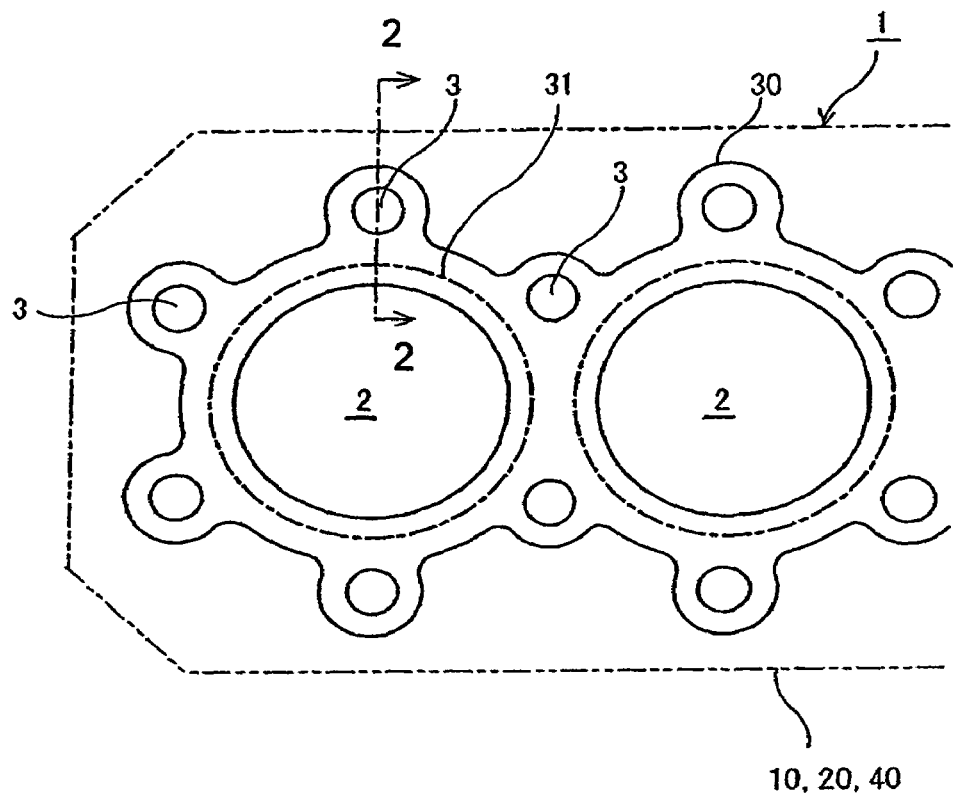
FIG. 1 is a plan view of a bead plate showing a structure of a laminate-type gasket of the first embodiment of the present invention.
Figure 2:
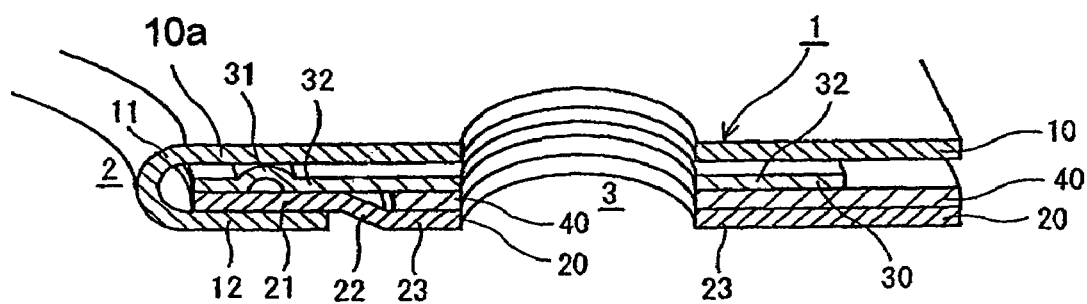
FIG. 2 is a cross sectional view taken along line 2-2 in FIG. 1 of the laminate-type gasket of the first embodiment of the present invention.

As shown in FIGS. 1, 2, the laminate-type gasket 1 of the first embodiment of the invention is the laminate-type gasket held between an exhaust manifold and an exhaust pipe for a multi cylinder engine, and seals a high-temperature and high-pressure combustion gas. This laminate-type gasket 1 includes metal structural plates such as a first metal substrate 10, a second metal substrate 20, a bead plate 30, an intermediate plate 40 and the like.

These metal structural plates 10, 20, 40 are manufactured in accordance with a shape of the engine member such as the exhaust manifold or the exhaust pipe and the like. Also, the metal structural plates 10, 20, 40 form first sealing-target holes 2 and bolt holes (second sealing-target holes) 3 for fastening bolts. On the other hand, as shown in FIG. 1, the bead plate 30 is continuously formed in such a way of surrounding both the first sealing-target holes 2 and the bolt holes 3.

The first and second metal substrates 10, 20, the bead plate 30 and the intermediate plate 40 are made of soft steel, annealed stainless (annealed material), or stainless thermal refining material (spring steel). Especially, the first metal substrate (first surface plate) 10 is made of annealed material which is excellent for heat resistance or corrosion resistance. Also, the bead plate 30 is made of spring material which is excellent for elasticity.

As shown in FIG. 2, the first metal substrate 10 includes a base portion 10a, a curved portion 11 and a folded portion (flange portion) 12 on the peripheral border portion of the first sealing-target hole 2 wherein a combustion gas passes through. The curved portion 11 and the folded portion 12 are made by folding back the first metal substrate 10. Also, the second metal substrate 20 is placed by inserting an inner-periphery side flat portion 21 of the second metal substrate 20 inside the folded portion 12. In the second metal substrate 20, a first half bead 22 is provided on the outer periphery side of the inner-periphery side flat portion 21 and extends toward a folded portion 12 side as the first half bead 22 approaches the outer side. An outer-periphery side flat portion 23 on the outer periphery side of the first half bead 22 is placed at the folded portion 12 side relative to a surface thickness direction.

Additionally, inside the folded portion 12, the bead plate 30 is laminated between the second metal substrate 20 and the first metal substrate 10 and includes a first full bead 31 which projects to the first metal substrate 10 side for the first sealing-target hole 2. Also, the intermediate plate 40 is laminated between the outer-periphery side flat portion 23 of the second metal substrate 20 and an outer-periphery side flat portion 32 on the outer periphery side of the first full bead 31 of the bead plate 30. The second sealing-target holes 3 are provided in the first metal substrate 10, the outer-periphery side flat portion 23 of the second metal substrate 20, the outer-periphery side flat portion 30 of the bead plate 30, and the intermediate plate 40. More specifically, around the second sealing-target hole 3, the first metal substrate 10; the outer-periphery side flat portion 30 of the bead plate 30; the intermediate plate 40; and the outer-periphery side flat portion 23 of the second metal substrate 20 are laminated in order.

According to the structure, the folded portion 12 can prevent the combustion gas from contacting the second metal substrate 20 or the bead plate 30, so that the first metal substrate 10 is required to be made of material which is excellent for heat resistance or corrosion resistance. However, the second metal substrate 20 or the bead plate can be made of materials which are excellent for elasticity. Accordingly, the gasket 1 can be made by the combination wherein characteristics of each material are applied. Therefore, with the structure, a gasket has various kinds of excellent performances such as sealing performance, heat resistance, corrosion resistance, durability and the like.

Also, since the first half bead 22 is provided in the second metal substrate 20, the inner-periphery side flat portion 21 of the first half bead 22 can be easily housed inside the folded portion 12, so that the portion 21 of the second metal substrate 20 can be easily inserted into the folded portion 12. As a result, the elasticity of the folded portion 12 can be improved and due to a stopper function of the insertion portion 21, cracking can be prevented.

As shown in FIG. 1, the laminate-type gasket 1 is formed by extending the bead plate 30 around the bolt holes 3 which are the second sealing-target holes. As shown in FIG. 2, as compared to the surrounding of the first sealing-target hole 2 and that of the second sealing-target hole 3, plate thicknesses of the laminated metal structural plates are approximately the same. As a result, the sealing performance of the second sealing-target hole 3 can be improved. Also, even when a large pressing force is applied, unequal seal surface pressures, which are generated around the respective first sealing-target hole 2 and second sealing-target hole 3, can be controlled. Accordingly, the deformation around the sealing-target holes on the side of the members holding the laminate-type gasket 1, can be prevented.

Figure 3:
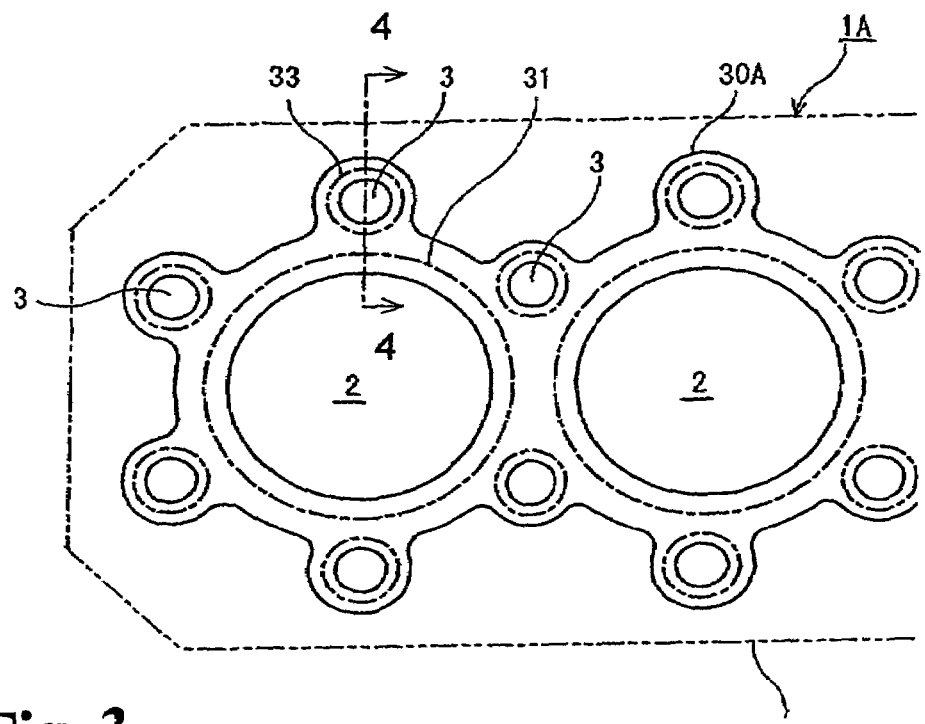
FIG. 3 is a plan view of the bead plate showing the structure of the laminate-type gasket of a second embodiment of the present invention.
Figure 4:
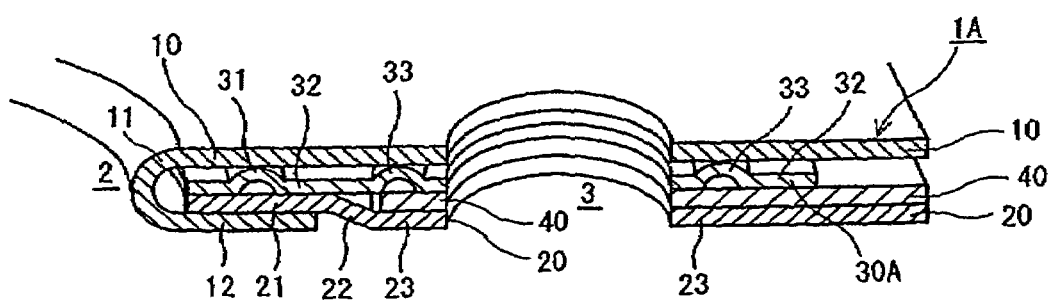
FIG. 4 is a cross sectional view taken along line 4-4 in FIG. 3 of the laminate-type gasket of the second embodiment of the present invention.

Next, a second embodiment will be explained. As shown in FIGS. 3, 4, in a laminate-type gasket 1A of the second embodiment, in addition to the structure of the laminate-type gasket 1 of the first embodiment, second full beads 33 are provided around the bolt holes 3 which are the second sealing-target holes. Other than the above-mentioned structure, the structure of the second embodiment is the same as that of the laminate-type gasket 1 of the first embodiment.

According to the structure, in addition to the above-mentioned operational effect of the first embodiment, due to the second full beads 33, sealing performance around the bolt holes 3 can be improved. This structure is especially effective when the laminate-type gasket is the cylinder head gasket and the like, and the second sealing-target holes 3 require the sealing performance such as a water hole and the like.

Figure 5:
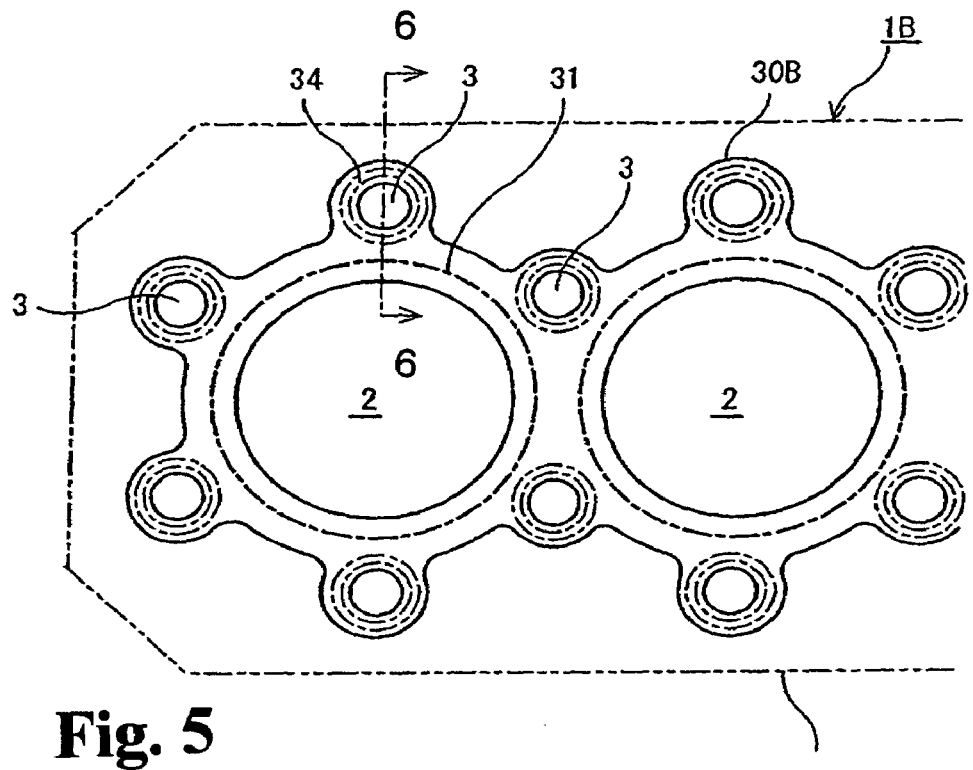
FIG. 5 is a plan view of the bead plate showing another structure of the laminate-type gasket of the second embodiment of the present invention.
Figure 6:
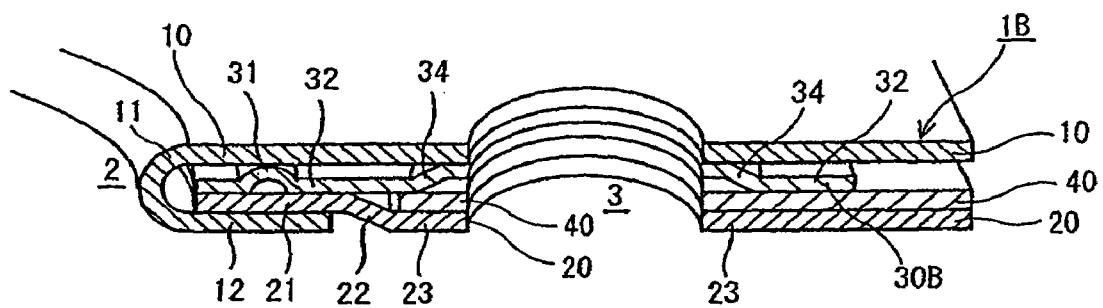
FIG. 6 is a cross sectional view taken along line 6-6 in FIG. 5 of the laminate-type gasket of the second embodiment of the present invention.
Figure 7:
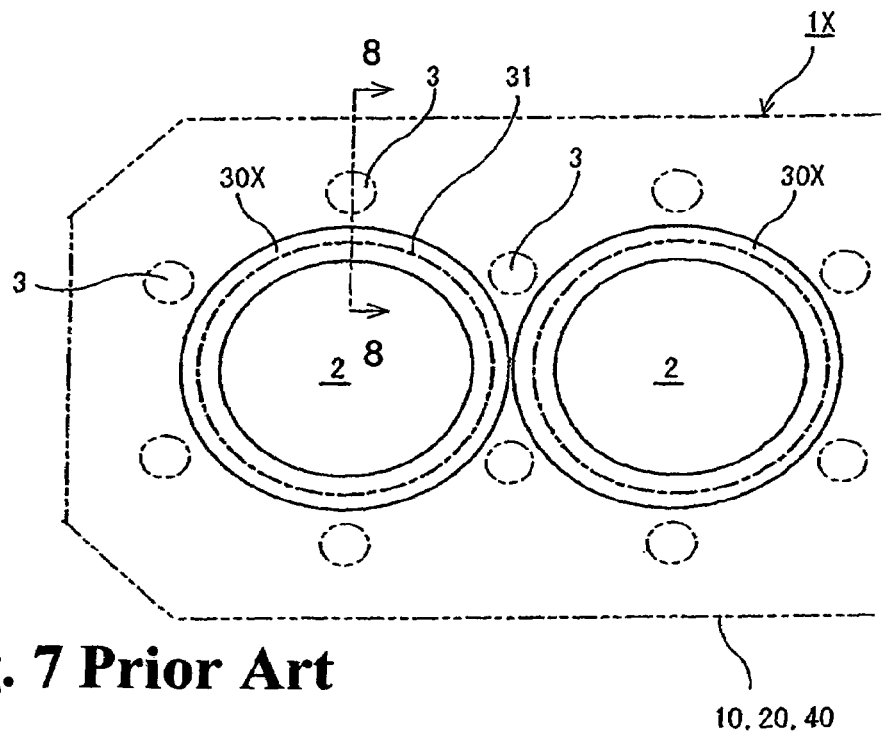
FIG. 7 is a plan view of the bead plate showing a structure of a conventional laminate-type gasket.
Figure 8:
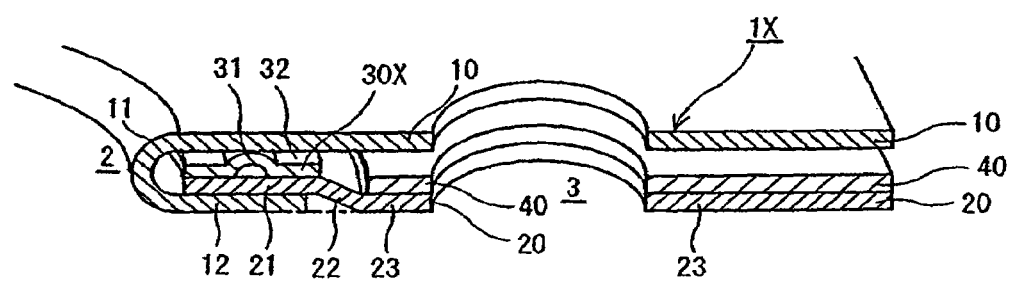
FIG. 8 is a cross sectional view taken along line 8-8 in FIG. 7 showing the laminate-type gasket as reference.

Incidentally, in the second sealing-target holes 3, when a high seal surface pressure is not required, in place of the second full beads 33, as shown in FIGS. 5, 6, second half beads 34 can be formed.

The disclosure of Japanese Patent Application No. 2007-036436, filed on Feb. 16, 2007, is incorporated in the application.

While the invention has been explained with reference to the specific embodiments of the invention, the explanation is illustrative and the invention is limited only by the appended claims.

What is claimed is:

1. A metal laminate gasket, comprising:
    a first metal substrate having a base portion, a curved portion extending from the base portion to define a cylinder bore, a folded portion extending from the curved portion, and a bolt or water hole formed in the base portion outside the folded portion adjacent the cylinder bore,
    a second metal substrate having an inner flat portion situated between the base portion and the folded portion, and an outer flat portion disposed outside the folded portion,
    an intermediate plate disposed between the base portion and the outer flat portion of the second metal substrate, and
    a bead plate situated under the base portion and including a first full bead disposed on the inner flat portion around the cylinder bore and projecting toward the base portion, and an outside portion disposed above the intermediate plate, said bead plate, second metal substrate and intermediate plate having bolt or water holes communicating with the bolt or water hole of the first metal substrate,
    wherein the bead plate is formed to surround the cylinder bore and bolt or water hole without extending to an entire area of the gasket.

2. A metal laminate gasket according to claim 1, wherein said second metal substrate further includes a first half bead formed between the inner and outer flat portions outside the folded portion.

3. A metal laminate gasket according to claim 1, wherein a total plate thickness of the first and second metal substrates, bead plate and intermediate plate at a position of the first full bead is substantially same as that around the bolt or water hole.

4. A metal laminate gasket according to claim 3, wherein said bead plate further includes a full or half bead around the bolt or water hole.

5. A metal laminate gasket according to claim 1, wherein said bead plate surrounds around the cylinder bore and bolt or water holes only.

6. A metal laminate gasket according to claim 1, wherein said bead plate has an annular shape to surround the cylinder bore, and projecting portions as the outside portion projecting radially outwardly from the cylinder bore and surrounding the respective bolt or water holes.

7. A metal laminate gasket according to claim 6, wherein said bead plate is integrally formed with a bead plate adjacent thereto.

8. A metal laminate gasket, comprising:
    a first metal substrate having a base portion, a curved portion extending from the base portion to define a cylinder bore, a folded portion extending from the curved portion, and bolt or water holes formed in the base portion outside the folded portion to surround the cylinder bore,
    a second metal substrate having an inner flat portion situated between the base portion and the folded portion, and an outer flat portion disposed outside the folded portion,
    an intermediate plate disposed between the base portion and the outer flat portion of the second metal substrate, and
    a bead plate situated under the base portion, and including an annular portion surrounding the cylinder bore and disposed on the inner flat portion, a first full bead formed on the annular portion and projecting toward the base portion, and projecting portions projecting radially outwardly from the annular portion and disposed above the intermediate plate, said projecting portions, second metal substrate and intermediate plate having bolt or water holes communicating with the bolt or water holes of the first metal substrate,
    wherein the bead plate is formed to surround the cylinder bore and bolt or water holes without extending to an entire area of the gasket.

9. A metal laminate gasket according to claim 8, wherein each of said projecting portions surrounds one bolt or water hole and spaced apart from a projecting portion adjacent thereto.

10. A metal laminate gasket according to claim 9, wherein said projecting portions situated adjacent to each other are connected only through the annular portion.

11. A metal laminate gasket according to claim 10, comprising a plurality of said bead plates connected together at portions situated adjacent to each other.

12. A metal laminate gasket according to claim 11, wherein said bead plate further includes second beads, each surrounding one bolt or water hole at the projecting portion.

* * * * *